United States Patent

Garro

Patent Number: 5,085,311
Date of Patent: Feb. 4, 1992

[54] IN-LINE ACCUMULATOR WITH ZERO BACKLINE PRESSURE

[76] Inventor: Gene Garro, 646 N. Saratoga Dr., Moorestown, N.J. 08057

[21] Appl. No.: 485,606

[22] Filed: Feb. 27, 1990

[51] Int. Cl.⁵ ............................................. B65G 47/26
[52] U.S. Cl. ...................................... 198/460; 198/809
[58] Field of Search ................................ 198/460, 809

[56] References Cited

U.S. PATENT DOCUMENTS

| | | | |
|---|---|---|---|
| 3,930,573 | 1/1976 | Wyman | 198/809 |
| 3,934,707 | 1/1976 | Bowman | 198/460 |
| 3,951,254 | 4/1976 | Juhrend | 198/809 |
| 4,149,626 | 4/1979 | Holt | 198/460 X |
| 4,238,026 | 12/1980 | Mrugala et al. | 198/460 |
| 4,436,200 | 3/1984 | Hodlewsky et al. | 198/851 |
| 4,511,030 | 4/1985 | Lem | 198/460 X |
| 4,732,265 | 3/1988 | von Stein | 198/809 X |
| 4,878,578 | 11/1989 | Brouwer | 198/809 |
| 4,925,005 | 5/1990 | Keller | 198/460 |

FOREIGN PATENT DOCUMENTS

| | | | |
|---|---|---|---|
| 0002106 | 5/1979 | European Pat. Off. | 198/809 |
| 2727638 | 12/1978 | Fed. Rep. of Germany | 198/809 |
| 0145018 | 7/1986 | Japan | 198/809 |

OTHER PUBLICATIONS

*REX TableTop Chain Engineering Manual,*; Manual No. 831270-R, Rexnord, Inc., Milwaukee, Wisconsin (1985).
Page taken from Alvey, Inc. literature for multi-strand chain conveyors and drag chain conveyors.

*Primary Examiner*—D. Glenn Dayoan
*Attorney, Agent, or Firm*—Woodcock Washburn Kurtz Mackiewicz & Norris

[57] ABSTRACT

A conveyor system combining a belt or chain which forms a continuous loop, a wear surface along both sides of the belt or chain, a drive motor for rotating the belt or chain and, thereby, for conveying a plurality of discrete product units upon the belt or chain, and apparatus for displacing the belt, the chain or the wear surfaces along both sides of the belt or chain to provide an in-line accumulator with zero backline pressure.

15 Claims, 4 Drawing Sheets

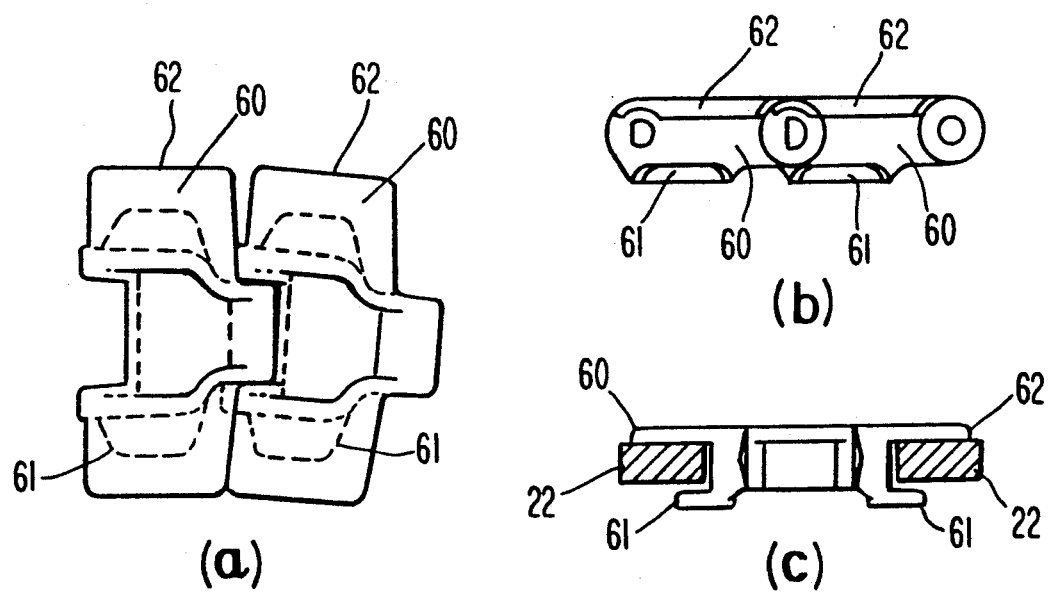
PRIOR ART
Fig. 6
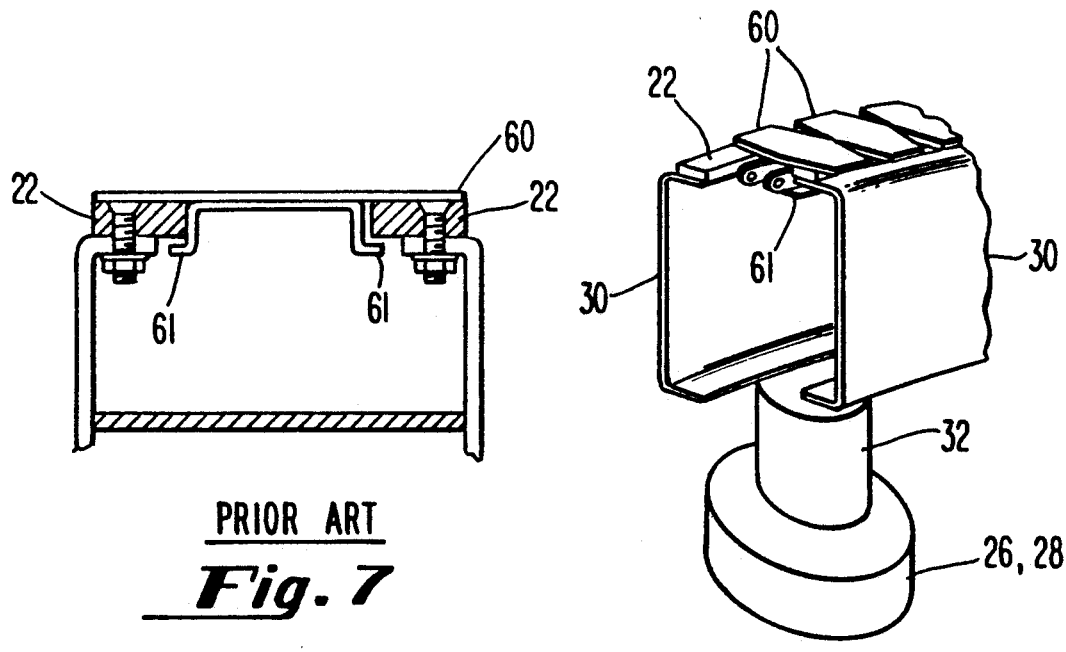
PRIOR ART
Fig. 7
Fig. 8

IN-LINE ACCUMULATOR WITH ZERO BACKLINE PRESSURE

BACKGROUND OF THE INVENTION

1. Field of the Invention

The present invention is related generally to conveyors, and more particularly to conveyors which utilize straight-running, sideflexing, or multiflexing tab chains.

2. Statement of the Prior Art

Within the conveyor art, there are three known types of chain conveyors: (1) those that support a product being conveyed; (2) those that carry an actuating element between two chains; and, (3) those that operate overhead or are set within the floor. See, e.g., Conveyor Equipment Manufacturers Association, *Conveyor Terms and Definitions*, 3d ed., 1979. Two basic types of chain conveyor, referred to as a "flat top plate" conveyor or a "hinged top plate" conveyor, are known for their abilities to carry bottles and jars, cans, small parts and food products over substantially horizontal, straight and curved paths. Such top plate chain conveyors usually consist of an "endless" chain of links 60, shown in FIG. 6., which is formed in a continuous loop around a drive or head sprocket and a tail or idler sprocket. The top plates 62 of each link 60 are welded on, snapped on or are formed integrally with respective links in the chain and tabs 61 extend transversely on the underside of each link 60 and are space below the top plates 62, as shown in FIGS. 6 and 7. As thus formed, the endless chains are guided through a carrying way 22 from the driven sprocket, around the idler sprocket and back to the drive sprocket through a return way. As shown in FIG. 6(b), the carrying way 22 is disposed between the top plate 62 and the tab 61. As shown in FIG. 7, at some locations, particularly where the conveyor goes around a corner, channels are attached to, and form a part of, the carrying way 22. Details of such chain conveyors are found in Manual #831270-B19C R of Rexnord Inc. which is incorporated herein by reference. See, *Rex TableTop ® chain Engineering Manual* (1985).

Sideflexing and multiflexing chain conveyors require some method of chain retention where going around corners for preventing the possibility of the chain lifting out of its carrying way (i.e., its "track"). One known method of such retention utilizes beveled surfaces on each link in the chain for mating with a complementary beveled surface on corner wear strips on either side of the track. Another known method shown in FIGS. 6 and 7, utilizes extended hold-down tabs 61 on the under side of each link 60 in the chain. The present invention is directed to these "tab chains" which provide positive retention through the tracking of the chain, around its carrying path, between such hold down tabs and their corresponding top plates.

Dependent upon the "slippage factor" of a particular tab chain, products on the conveyor may accumulate. That is, slippage factors take into consideration the coefficient of friction of the materials used to make the tab chain, and account for accumulation of the product on the conveyor and the duration of time it occurs. Significant problems of "backline pressure" are experienced during such accumulation, however, and those of skill in the conveyor art have persistently sought out designs which avoid these problems.

One approach in conveyor design which was initially used was the use of off-line accumulators. Such approaches transferred the product that was accumulating out of the mainstream, and on to adjacent conveyor paths that subsequently reentered the mainstream at a point downstream of the accumulator. As a result of a longer path which would be taken by product in such off-line accumulators, problems of backline pressure could be avoided. However, since the off-line accumulators require an additional adjacent conveyor path, they are more difficult to design and more costly to implement.

Another approach which has been utilized which avoids any added conveyor paths is the in-line accumulator. Many low friction thermoplastic materials (e.g., LF Acetal) have been used for chains to enable the product to slide upon the moving chain surface during accumulation. Such low friction material reduced backline pressure and, thereby, reduced product damage during accumulation. However, product damage still occurred, requiring further development. "Low backline pressure" chains (e.g., LBP821 and L8P882TAB series chains manufactured by Rexnord Inc.) brought about a significant reduction in backline pressure via a series of small, closely spaced rollers. These rollers provided a stable conveying surface while at the same time provided positive motion as necessary. Nevertheless, backline pressure has heretofore never been eliminated or even substantially eliminated.

SUMMARY OF THE INVENTION

Accordingly, it is a general object of this invention to provide improved conveyor systems. It is a more particular object of the present invention to provide novel in-line accumulators for such conveyor systems.

Another object of the invention is to provide an in-line accumulator which avoids problems of product loss or damage during accumulation thereof on a conveyor system.

Still another object of this invention is to provide in-line accumulators with zero backline pressure.

Briefly, the above and other objects of this invention are accomplished through a combination which generally comprises: (1) conveyor means forming a continuous loop; (2) a wear surface along both sides of the conveyor means; (3) means for driving the conveyor means and thereby for conveying a plurality of discrete product units; and (4) means for displacing the conveyor means or the wear surfaces at both sides of the conveyor means to provide an in-line accumulator with zero backline pressure.

According to one embodiment of the present invention, the conveyor means comprises a tab chain. Such tab chain may, in turn, suitably comprise a straight-running chain, or a sideflexing chain, or a multiflexing chain. In this embodiment, the tab chain forms a continuous loop about a carrying way which carries the tab chain away from the driving means and a return way, disposed beneath the carrying way, for returning the tab chain to the driving means.

The displacing means with this embodiment comprises means for displacing the carrying way to a level of the wear surfaces and means for displacing the carrying way beneath the level of the wear surfaces. Accordingly, the product units which are conveyed by the tab chain are subjected to zero backline pressure when the carrying way is displaced beneath the level of the wear surfaces. With this embodiment, it is the tab chain which is preferably displaced above the level of the wear surfaces to convey the product units. A part of the carrying way is movable in a direction towards and away from the level of the wear surfaces and the tab chain is carried by that part. When the part is displaced upwardly by suitable means, such as a reciprocable rod, the driven tab chain is carried along a path above the wear surfaces to convey the product units. However, when that part is displaced downwardly (for example, upon the retraction of the reciprocable rod), the tab chain continues to be driven upon the carrying way beneath the wear surfaces. Product units will lay upon the wear surfaces which are adjacent the movable part, at zero backline pressure, until the movable part is again displaced upward by the reciprocable rod.

The conveyor means according to another embodiment of the present invention suitably comprises any other "belt-type" conveyor media, such as fabric belts, and metal belts made of woven and flat wire, linked rods and steel bands. These conveyor means, likewise, form a continuous loop which is driven in a horizontal plane by the driving means. A pair of displaceable wear surfaces provided along both sides of the conveyor means is displaced from a position below the horizontal plane to a position thereabove to provide an in-line accumulator with zero backline pressure.

Other uses, advantages and novel features according to the present invention will become more apparent from the following detailed description thereof, when considered in conjunction with the accompanying drawings wherein:

BRIEF DESCRIPTION OF THE DRAWINGS

FIGS. 6(a), (b) and (c) show plan, longitudinal elevation and transverse elevation views, respectively, of the tabs in a tab chain conveyor according to the prior art.

FIG. 7 is a cross-section through a portion of tab chain conveyor according to the prior art.

FIG. 8 is an isometric view of the accumulator of the current invention as applied to the tab chain conveyor shown in FIGS. 6 and 7.

DETAILED DESCRIPTION OF THE INVENTION

Figure 1:
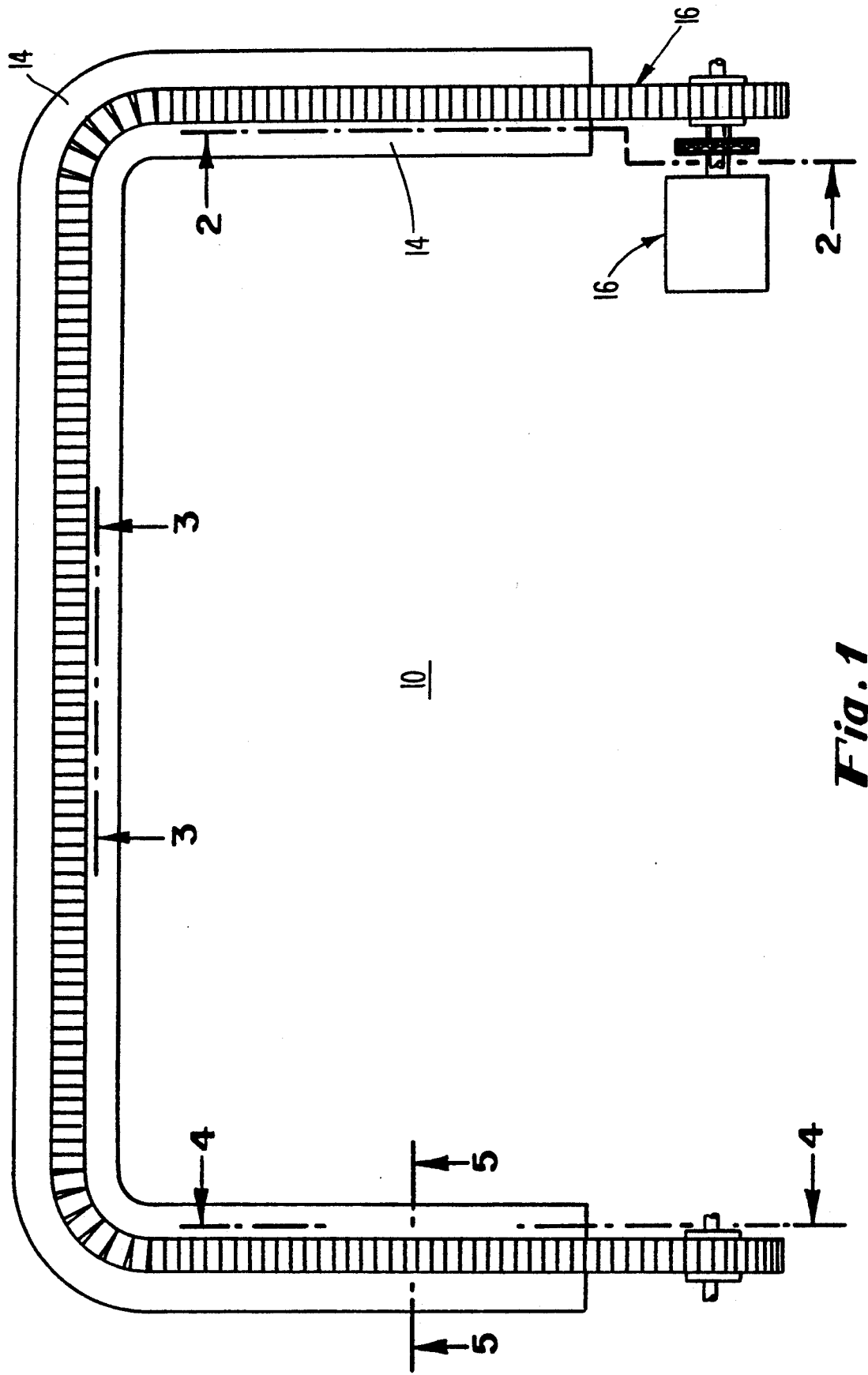
FIG. 1 is a plan view of a conveyor system according to the present invention.

Referring now to the drawings, wherein similar element numbers designate like or corresponding parts throughout each of the several views, there is shown in FIG. 1 a conveyor system 10 according to the present invention.

Figure 2:
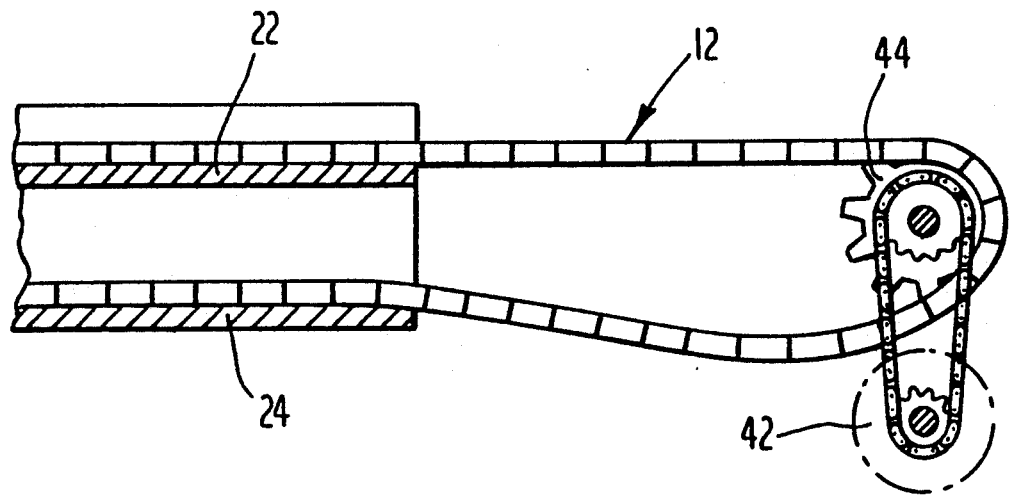
FIG. 2 is an elevational view of a first portion of the conveyor system of FIG. 1, taken along lines 2—2 and illustrating means for driving the conveyor system according to this invention.
Figure 3:
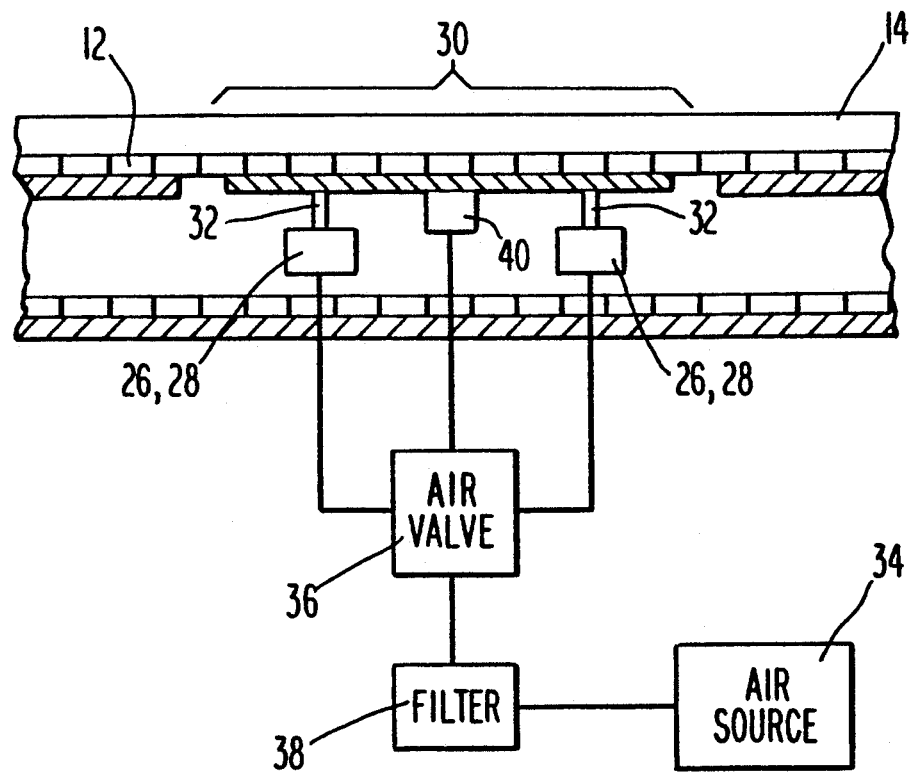
FIG. 3 is an elevational view of a second portion of the conveyor system of FIG. 1, taken along lines 3—3 and illustrating an in-line accumulator according to one embodiment of the present invention.
Figure 4:
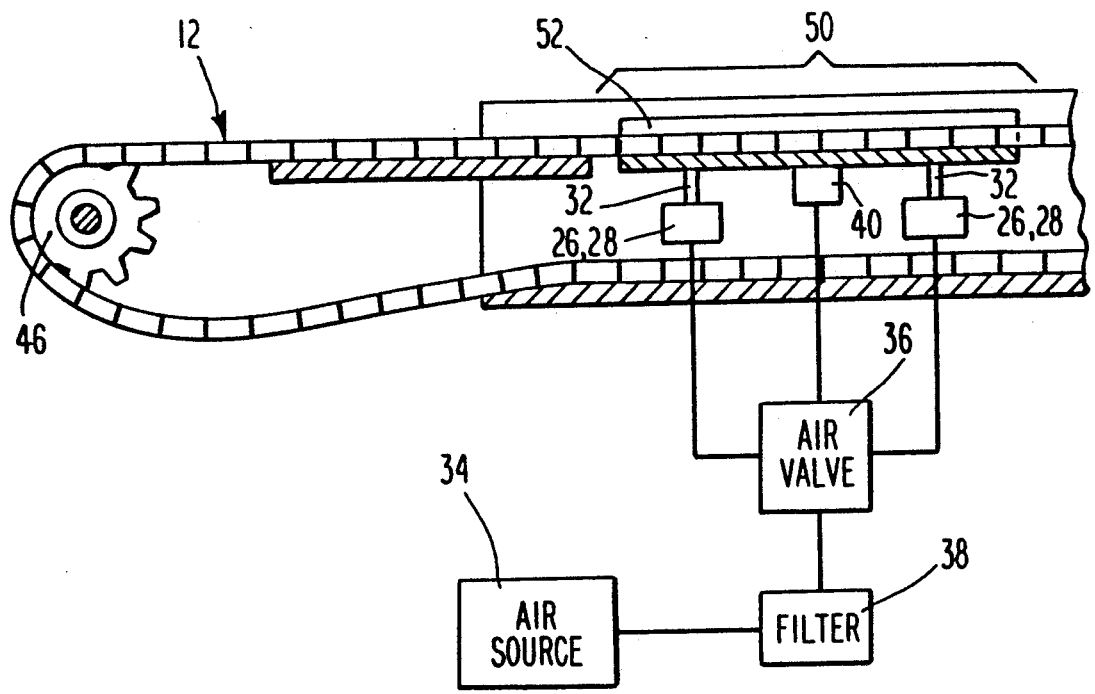
FIG. 4 is an elevational view of a third portion of the conveyor system of FIG. 1, taken along lines 3—3 and illustrating another in-line accumulator according to this invention.

As shown more clearly in FIGS. 2–4, in conjunction with FIG. 1, the conveyor system 10 generally comprises conveyor means 12 which forms a continuous loop, a wear surface 14 at both sides of the conveyor means 12, means 16 for driving the conveyor means 12 and, thereby, to convey a plurality of discrete product units (not shown), and means for displacing the conveyor means 12 or the wear surfaces 14 along both sides of the conveyor means 12 to provide an in-line accumulator 20 with zero backline pressure.

Referring for the moment to FIG. 2, it can be seen that the conveyor means 12 comprises a conventional tab chain, such as those manufactured by Rexnord Inc. of Milwaukee, Wis., as shown in FIGS. 6 and 7. Other forms of conveyor media may be used, however, such as fabric belts, and metal belts that are made of woven and flat wire, linked rods and steel bands. According to this embodiment, the tab chain forms a continuous loop about a carrying way 22 and a return way 24. The carrying way 22 carries the tab chain away from the driving means 16 while the return way 24, disposed beneath the carrying way 22, returns the tab chain to the driving means 16.

The displacing means with this embodiment comprises means 26 for displacing the carrying way 22 to a level above the wear surfaces 14 and means 28 for displacing the carrying way 22 beneath the level of the wear surfaces 14. Accordingly, product units conveyed by the tab chain are subjected to a substantially zero backline pressure when carrying way 22 is displaced beneath the level of the wear surfaces 14. For this embodiment, the tab chain is displaced above the level of wear surfaces 14 to convey the product units. As shown in FIGS. 3 and 8, one part 30 of carrying way 22 is movable in a direction towards and away from the level of the wear surfaces 14 and the tab chain is carried by the part 30. When part 30 is displaced upwardly by suitable means, such as a reciprocable rod 32, the carrying way 22 presses upward on the lower surfaces of the top plates 62 of the links 60 so that the rotating tab chain is carried along a path above the wear surfaces 14 to convey the product units. However, when the part 30 is displaced downwardly (e.g., upon retraction of reciprocable rod 32), the carrying way 22 presses down on the upper surface of the tabs 61 of the links 60, thereby pulling the tab chain down so that the tab chain continues to rotate upon the carrying way 22 beneath the wear surfaces 14. Product units will lay upon the wear surfaces 14 adjacent the movable part 30, at zero backline pressure, until the movable part 30 is again displaced upward by the reciprocable rod 32. Movable part 30 preferably comprises a channel formed of metal, such as stainless steel, or any plastic, such as an ultra-high molecular weight polyethylene, to which the reciprocable rod 32 is operatively connected, as shown in FIGS. 3 and 8. Preferably, the means 26, 28 for displacing carrying way 22 between the level above the wear surfaces 14 and the level beneath wear surfaces 14 suitably comprises a Bimba cylinder (Model #FO-17-0.500-3F) which includes reciprocable rod 32. These cylinders, as is well known, are typically air-actuated. Accordingly, the means 26, 28 further comprises a source 34 of pressurized air, an air valve 36, such as an ARO Model #A212SS-120A, a filter regulator 38, such as an ARO Model #129231-020, and switch means 40 for actuating the air valve 36 to operate the cylinders comprising means 26, 28.

As is also shown in FIGS. 2 and 4, the driving means 16 generally comprises a drive motor 42, a drive sprocket 44 that is chain-driven by drive motor 42, and an idler wheel 46. The tab chain according to this embodiment preferably comprises a Rexnord Model #LF880 Tab K, 3¼, as shown in FIG. 6 formed in a continuous loop about the drive sprocket 44 and idler wheel 46. One suitable such drive motor 42 is SEW Eurodrive Model #SA40D14DT80K4. The drive sprocket 44 suitably comprises an 880-style sprocket manufactured by Rexnord Inc., while idler wheel 46 suitably comprises a Rexnord Model 25T idler wheel.

Referring more specifically for the moment to FIGS. 3 and 8, it can be seen that a pair of cylinders are provided as the means 26, 28. The movable part 30 of the carrying way 22 comprises a length of channel approximately three feet long with a cylinder placed at both of its ends. In-line accumulator 20, alternatively, includes input means for controlling the actuation of means 26, 28, and, thereby, for controlling output of product units from the in-line accumulator 20. One suitable such input means 48 comprises sensor means coupled to the means 26, 28 for indicating when product unit is within the in-line accumulator 20. Exemplary of the sensor means are LED-phototransistor pairs and air sensors, whereby beams of light or air are adapted to be broken by the product units. On accumulation of such product units with the in-line accumulator 20, the sensor means can be adapted to cause both cylinders to retract their respective reciprocable rods 32 to allow the movable part 30 to bring that portion of the rotating tab chain within the in-line accumulator 20 below the level of the wear surfaces 14. When this happens, product units within the in-line accumulator 20 rest upon the wear surfaces 14, without being carried by the tab chain, and, thereby with zero backline pressure.

Figure 5:
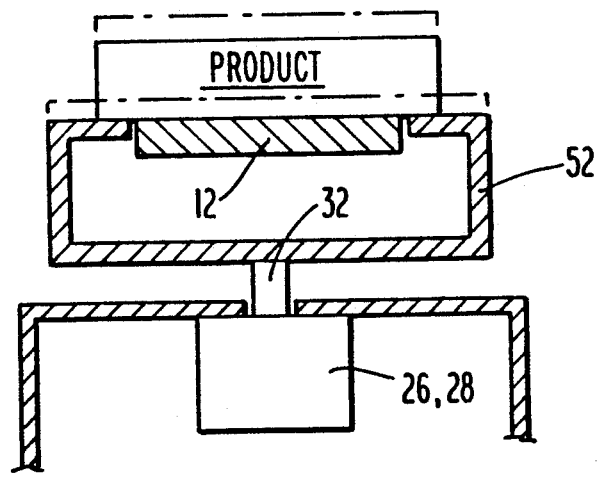
FIG. 5 is a sectional view of the in-line accumulator of FIG. 4, taken along lines 5—5.

Referring again to FIG. 4, in conjunction with FIG. 5, another embodiment of an in-line accumulator 50 according to the present invention will now be described. In this embodiment, the conveyor means 12 suitably comprises a "belt-type" conveyor media, such as fabric belts, and metal belts made of woven and flat wire, linked rods and steel bands. Conveyor means 12 forms a continuous loop which carries the product units in a substantially horizontal plane. A pair of displaceable wear surfaces 52 is provided along both sides of conveyor means 12, and is displaced from a position below the horizontal plane to a position thereabove to provide in-line accumulator 50 with zero backline pressure. As shown in FIG. 5, conveyor means 12 does not include a carrying way, or a return way. However, the wear surfaces 52 within the in-line accumulator 50 are displaced upwardly by means 26, 28, such as Bimba cylinders. The wear surfaces 52 suitably comprise a metal such as a stainless steel or plastic such as ultra-high molecular weight polyethylene. Furthermore, wear surfaces 52 may be suitably joined together as a channel member as shown in FIG. 5.

Obviously, many modifications and variations are possible in light of the teachings. For example, the displacing means 18 may suitably comprise any other means for displacing the channel members forming movable parts 30, or displaceable wear surfaces 52, such as a solenoid, whether air-operated, electrically-operated or magnetically-operated, as long as such solenoids act to extend and retract a piston rod such as reciprocable rod 32. Alternatively, the displacing means 18 may suitably comprise any mechanical means such as a lever-operated cam which is in contact with the underside of the channel members which form movable parts 30, or displaceable wear surfaces 52. In such a manner, the cam would include surfaces that would allow those channel members to be displaced upwardly and downwardly relative to a conveyor means. It should be understood, therefore, that within the scope of the appended claims the present invention may be practiced otherwise than is specifically described herein.

What I claim as my invention is:

1. An in-line accumulator for a conveyor, comprising:
   (a) conveyor means having a plurality of chain links forming a continuous loop, each said link having a plate forming a top surface and a tab extending transversely from said link and spaced below said plate;
   (b) a carrying way having a moveable portion, said carrying way movable portion having means for engaging each of said chain links between said plate and said tab;
   (c) a pair of wear surfaces, each of which is disposed on a respective side of said conveyor means;
   (d) means for driving said conveyor means; and
   (e) means for displacing a portion of said continuous loop of chain links relative to said wear surfaces to provide zero backline pressure, said displacing means operatively connected to said moveable portion of said carrying way.

2. The in-line accumulator according to claim 1, wherein said moveable portion of said carrying way comprises a channel.

3. The in-line accumulator according to claim 2, wherein said channel is approximately three feet long.

4. The in-line accumulator according to claim 2, wherein:
   (a) said channel has first and second ends; and
   (b) said displacing means comprises first and second actuating cylinders disposed at said first and second ends of said channel, respectively.

5. The in-line accumulator according to claim 1, wherein said displacing means comprises an actuating cylinder.

6. In a conveyor system of the type having (i) a tab chain having a plurality of links, each said link having a plate forming a top surface and a tab extending transversely from said link and spaced below said plate, (ii) means for driving said tab chain in a continuous loop formed by a carrying path and a return path, and (iii) a wear surface adjacent said carrying path, the improvement comprising:
   (a) a section of said carrying path being movable in the vertical direction; and
   (b) means for displacing said movable section of said carrying path, at selected portions of said conveyor system, to a level above and beneath said wear surface, said displacing means having means for engaging said links between said plates and said tabs, whereby said displacement of said movable section below said wear surface provides a substantially zero backline pressure on products carried by said conveyor system.

7. The improved conveyor system according to claim 6 wherein said means for displacing said movable section of said carrying path comprises:
   (a) a bottom surface on said movable section;
   (b) a pair of reciprocable pins disposed, respectively, at opposing ends of said movable section in contact with said bottom surface thereof;
   (c) means for moving each pair of pins between an extended position and a retracted position; and
   (d) means for activating said moving means;

whereby said movable section is adapted to be disposed above said wear surface when its respective pair of pins are at said extended position, and beneath said wear surface when its respective pair of pins are at said retracted position.

8. An in-line accumulator for a conveyor, comprising:
(a) conveyor means forming a continuous loop;
(b) a pair of wear surfaces, each of which is disposed on a respective side of said conveyor means;
(c) means for driving said conveyor means; and
(d) means for pulling a portion of the length of said conveyor means downward below said wear surface so as to provide zero backline pressure.

9. The in-line accumulator according to claim 8, wherein:
(a) said conveyor means comprises a plurality of chain links, each said link having a plate forming a top surface and a tab extending transversely from said link and spaced below said plate, each of said tabs having an upper surface and a lower surface; and
(b) said pulling means comprises means for pressing downward on said tab upper surfaces.

10. The in-line accumulator according to claim 9, further comprising a carrying way for said conveyor means, and wherein said downward pressing means comprises a portion of said carrying way which is moveable in the vertical direction.

11. The in-line accumulator according to claim 10, wherein each of said link plates has an upper and a lower surface, and wherein said moveable portion of carrying way further comprises means for pushing said portion of the length of said conveyor means upward so that said upper surface of a portion of said link plates rises above said wear surfaces.

12. The in-line accumulator according to claim 11, wherein said upward pushing means has means for pressing upward on said lower surfaces of said plates.

13. The in-line accumulator according to claim 10, wherein said pulling means comprises a pneumatic cylinder operatively connected to said moveable portion of said carrying way.

14. The in-line accumulator according to claim 13, wherein said moveable portion of said carrying way comprises a channel.

15. The in-line accumulator according to claim 10, wherein said carrying way further comprises a plurality of fixed portions, said moveable portion of said carrying way being interposed between said fixed portions.

* * * * *